(12) United States Patent  
George et al.

(10) Patent No.: US 8,315,228 B2
(45) Date of Patent: Nov. 20, 2012

(54) SYSTEM, METHOD AND DEVICE FOR HANDLING VOICE CALLS ON A DUAL-MODE WIRELESS MOBILE COMMUNICATION DEVICE

(75) Inventors: Richard John George, Waterloo (CA); Miranda Bing Ying Lim, Nepean (CA); Marian Constantin Buzdugan, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 307 days.

(21) Appl. No.: 12/774,791

(22) Filed: May 6, 2010

(65) Prior Publication Data

US 2011/0182273 A1    Jul. 28, 2011

Related U.S. Application Data

(60) Provisional application No. 61/297,995, filed on Jan. 25, 2010.

(51) Int. Cl.
*H04W 4/00* (2009.01)

(52) U.S. Cl. ......... 370/331; 370/229; 370/310; 370/328

(58) Field of Classification Search .................. 370/229, 370/230, 310, 328, 331, 332
See application file for complete search history.

(56) References Cited

U.S. PATENT DOCUMENTS

| | | | |
|---|---|---|---|
| 6,507,740 B2 * | 1/2003 | Shi ............................... | 455/437 |
| 2005/0271011 A1 | 12/2005 | Alemany et al. | |
| 2006/0003768 A1 | 1/2006 | Chiou | |
| 2006/0083199 A1 | 4/2006 | Yang | |
| 2006/0286984 A1 | 12/2006 | Bonner | |
| 2007/0115883 A1 | 5/2007 | Narayanan et al. | |
| 2007/0218906 A1 * | 9/2007 | Melia et al. .................... | 455/436 |
| 2007/0249365 A1 | 10/2007 | Jendbro | |
| 2008/0076428 A1 * | 3/2008 | Jagadeesan et al. .......... | 455/436 |
| 2008/0096560 A1 * | 4/2008 | Felske et al. ................... | 455/436 |
| 2009/0010222 A1 | 1/2009 | Jechoux | |
| 2009/0154426 A1 * | 6/2009 | Perraud et al. ................ | 370/332 |
| 2010/0056157 A1 * | 3/2010 | Verona et al. ................. | 455/438 |
| 2010/0226339 A1 * | 9/2010 | Stephenson et al. .......... | 370/332 |
| 2010/0284374 A1 * | 11/2010 | Evans ........................... | 370/332 |
| 2011/0103318 A1 * | 5/2011 | Ekici et al. .................... | 370/329 |

FOREIGN PATENT DOCUMENTS

| | | | |
|---|---|---|---|
| GB | 2337184 | A | 11/1999 |
| GB | 2342255 | A | 4/2000 |
| WO | WO2004/066707 | A2 | 8/2010 |
| WO | WO2004/066707 | A3 | 8/2010 |

* cited by examiner

*Primary Examiner* — Kwang B Yao
*Assistant Examiner* — Nguyen Ngo

(57) ABSTRACT

To handle a communication session at a wireless mobile communications device, after receiving an indication of current signal strength of an access point for a wireless local area network ("WLAN") a signal strength threshold associated with the access point is retrieved. If the communication session is currently carried by a cellular network and the current signal strength exceeds the signal strength threshold, the communication session is switched from the cellular network to the WLAN. A metric is then adjusted based on timing of the switch relative to any switch of the communication session from the WLAN to the cellular network over a preceding time window associated with the access point. Based on the metric, the signal strength threshold associated with the access point is selectively adjusted. If, on the other hand, the communication session is currently carried by the WLAN and the current signal strength is below the signal strength threshold, an attempt is made to switch the communication session from the WLAN to the cellular network and a metric associated with the access point is adjusted based on whether or not the switch failed. Based on this second metric, the signal strength threshold associated with said access point is adjusted.

16 Claims, 9 Drawing Sheets

SYSTEM, METHOD AND DEVICE FOR HANDLING VOICE CALLS ON A DUAL-MODE WIRELESS MOBILE COMMUNICATION DEVICE

CROSS-REFERENCE TO RELATED APPLICATIONS

This application claims priority from U.S. provisional application No. 61/297,995, filed Jan. 25, 2010, the contents of which are incorporated herein by reference.

FIELD OF THE TECHNOLOGY

The disclosure relates generally to decision algorithms for vertical hand-off of a communication session, such as a voice call, between a wireless access network and a cellular network.

BACKGROUND

Mobile communication can be provided by different types of wireless networks, such as cellular networks and wireless local area networks (WLANS).

In dual-mode mobile devices, it may be advantageous to make use of a WLAN when available, and be able to switch to a cellular network when the WLAN is no longer available.

There remains a need for mechanisms for transferring an ongoing communication session (e.g. a voice call) on a dual-mode mobile device from an AP in a WLAN to a BTS in a cellular network (or vice-versa).

BRIEF DESCRIPTION OF THE DRAWINGS

In the figures which illustrate embodiments by example only.

DETAILED DESCRIPTION

In overview, to handle a communication session at a wireless mobile communications device, after receiving an indication of current signal strength of an access point for a wireless local area network ("WLAN") a signal strength threshold associated with the access point is retrieved. If the communication session is currently carried by a cellular network and the current signal strength exceeds the signal strength threshold, the communication session is switched from the cellular network to the WLAN. A metric is then adjusted based on timing of the switch relative to any switch of the communication session from the WLAN to the cellular network over a preceding time window associated with the access point. Based on the metric, the signal strength threshold associated with the access point is selectively adjusted. If, on the other hand, the communication session is currently carried by the WLAN and the current signal strength is below the signal strength threshold, an attempt is made to switch the communication session from the WLAN to the cellular network and a metric associated with the access point is adjusted based on whether or not the switch failed. Based on this second metric, the signal strength threshold associated with said access point is adjusted.

Figure 1A:
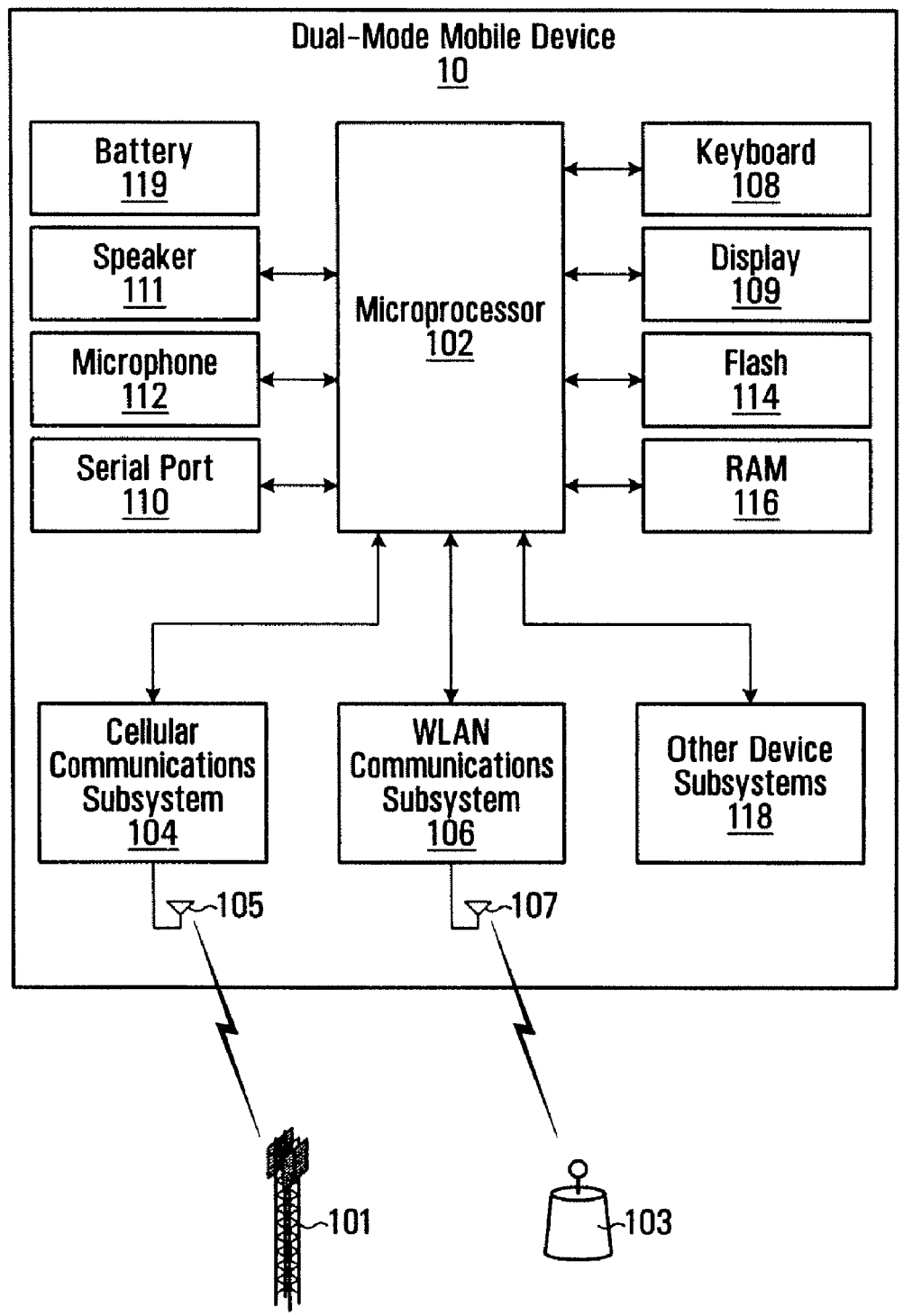
FIG. 1A is a schematic diagram of a dual-mode mobile device.

FIG. 1A illustrates a schematic diagram of a dual-mode mobile communication device 10 exemplary of an embodiment of the present disclosure. Dual-mode mobile communication device 10 is preferably a cellular network/WLAN dual-mode mobile device having voice and data communication capabilities, which can communicate via either cellular networks or wireless local area networks (WLANs).

Mobile device 10 includes a microprocessor 102, a cellular communications subsystem 104; a WLAN communications subsystem 106; a keyboard 108 and a display 109, along with other input/output devices including a serial port 110, a speaker 111 and a microphone 112; as well as memory devices including a flash memory 114 and a Random Access Memory (RAM) 116; and various other device subsystems 118. The mobile device 10 may have a battery 119 to power the active elements of the mobile device 10.

Operating system software executed by microprocessor 102 is stored in flash memory 114, however it may be stored in other types of memory devices, such as a read only memory (ROM) or a similar storage element. Flash memory 114 also stores application software which may have been installed on mobile device 10 during manufacture or which may have been downloaded to the mobile device 10. Microprocessor 102, in addition to its operating system functions, enables execution of software applications on mobile device 10.

System software and specific device applications, or parts thereof, may be temporarily loaded into a volatile store, such as RAM 116. Communication signals received by the mobile device may also be stored to RAM 116.

Communication functions, including data and voice communications, may be performed through either a cellular communication subsystem (CCS) 104 or through a WLAN communication subsystem (WCS) 106.

CCS 104 uses one or more antennae, illustrated as antenna 105, configured for transmitting and receiving radio frequency (RF) signals to and from base transceiver stations (BTSs), such as BTS 101, of conventional cellular networks. The specific design and implementation of CCS 104 is dependent upon the type of cellular network in which the mobile device 10 is intended to operate. For example, CCS 104 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc.

WCS 106 uses one or more antennae, illustrated as antenna 107, configured for transmitting and receiving RF signals to and from conventional access points (APs), such as AP 103, of conventional WLANs. The specific design and implementation of WCS 106 is dependent upon the WLAN in which the mobile device 10 is intended to operate. In one embodiment, WCS 106 is configured to operate in accordance with the IEEE 802.11x standard.

During data communications, a signal, such as a text message or web page download, may be received and processed by one of CCS 104 or WCS 106 and passed to microprocessor 102. The received signal is then further processed by microprocessor 102 for an output to display 109, or alternatively to some other auxiliary I/O device. A device user may also compose data items, such as e-mail messages, using keyboard 108 and/or some other auxiliary I/O device, such as a touch-pad, a rocker switch, a thumb-wheel, or some other type of input device. The composed data items may then be transmitted over the cellular network via the CCS 104 or the WCS 106.

During voice communications, overall operation of the device is substantially similar to that of data communications, except that received signals are output to speaker 111, and signals for transmission are generated by microphone 112. Alternative voice or audio I/O subsystems, such as a voice message recording subsystem, may also be implemented on device 10. In addition, display 109 may also be utilized in voice communication mode, for example, to display the identity of a calling party, the duration of a voice call, or other voice call related information.

Figure 2:
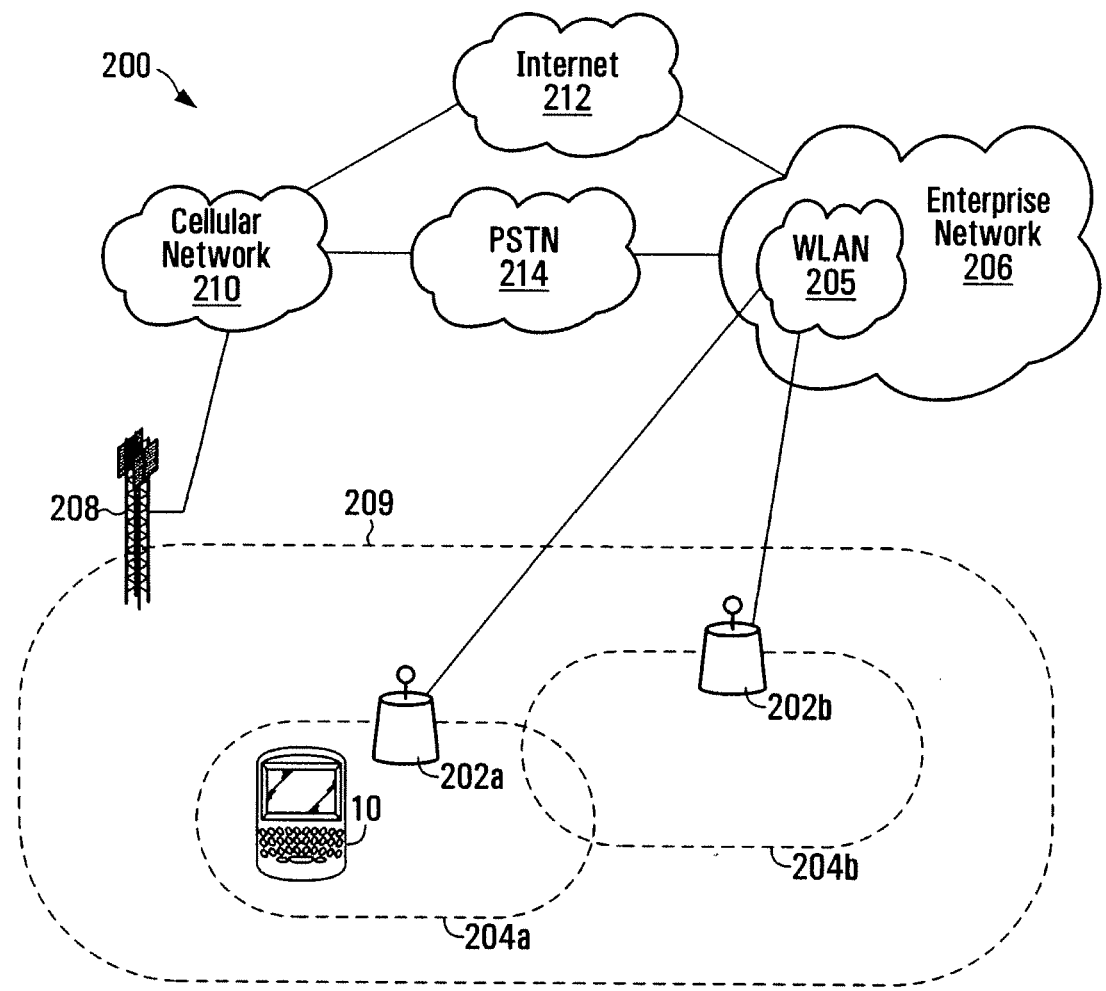
FIG. 2 is a schematic diagram of a wireless access system including the dual-mode mobile device of FIG. 1.

FIG. 2 illustrates a schematic diagram of a wireless access system designated generally as 200. The system 200 includes a cellular network 210; and a WLAN 205 forming part of an enterprise network 206. It is noted that although this description references a WLAN and a cellular network, the teachings herein may easily be adapted by one of skill in the art to improve the transition between any two wireless networks either presently known in the art or later developed.

Cellular network 210 includes a conventional base transceiver station (BTS) 208 which serves a coverage area 209. BTS 208 provides communications with mobile device 10 by way of the CCS 104. Cellular network 210 may be any of a variety of mobile data communication networks, such as Mobitex™, DataTAC™ or General Packet Radio Service (GPRS), or voice communication networks, such as Advanced Mobile Phone Service (AMPS), Time Division Multiple Access (TDMA), Code Division Multiple Access CDMA, Personal Communications Service (PCS), Global System for Mobile Communications (GSM).

WLAN 205 includes two conventional access points (APs) 202, designated as AP 202a and AP 202b, which serve respective coverage areas 204a and 204b. As is conventional in wireless networks having mobile devices served by various APs, such as in an IEEE 802.11x network, there is a standard procedure by which mobile device 10 associates itself with an AP 202. Before mobile device 10 associates with an AP 202, it obtains information from APs within range by scanning the frequency channels for their beacons. The APs 202 periodically broadcast a management frame called a beacon frame to announce their presence. Included in the beacon frame is a Service Set Identifier (SSID) which identifies the WLAN 205 to which the APs 202 belong. In traditional WLANs, such as 802.11x networks, beacon powers of APs are kept at a fixed level. Mobile device 10 may simply choose the AP 202 with the best signal strength for association. This procedure is performed seamlessly by the WCS 106 of mobile device 10.

In the scenario illustrated in FIG. 2, mobile device 10 is shown to be within range of AP 202a (i.e. mobile device 10 is within coverage area 204a). As such, mobile device 10 may detect beacon frames broadcast by AP 202a. WCS 106 of mobile device 10 may associate with AP 202a for data communications. In the event that the user of mobile device 10 moves within range of AP 202b (i.e. into coverage area 204b), mobile device 10 may begin to also receive beacon frames broadcast by AP 202b. WCS 106 may then decide to end the current association with AP 202a and associate with AP 202b. This feature which lets the WCS 106 of mobile device 10 switch the association from one AP to another is well known, and is typically referred to as roaming. The decision whether to roam from one AP to another may be based on various criteria, including signal strength and load balance. Roaming is performed by the WCS 106 of mobile device 10.

Referring to FIG. 2, in the area with WLAN coverage (i.e. coverage areas 204a and 204b), access to both the cellular network 210 and the WLAN 205 is available (referred to herein as a "double-coverage area"), while there are also service areas with only cellular access (referred to herein as a "cellular-only area"). A new voice call in the double-coverage area can be admitted either to cellular network 210 or to WLAN 205. Moreover, ongoing communication sessions such as voice calls can be dynamically transferred between APs 202a and 202b by horizontal hand-offs (HHOs) or between cellular network 210 and WLAN 205 by vertical hand-offs (VHOs).

As is conventional, mobile device 10 may be configured to have different communication modes, including (1) a cellular only mode, where mobile device 10 can only communicate over cellular networks; (2) an independent cellular and WLAN mode, where mobile device 10 can communicate over both cellular networks and WLAN, but the two are independent of each other; and (3) a WLAN priority mode, where mobile device 10 communicates via WLAN when available, and switches to communicate via cellular networks when WLAN is no longer available.

Figure 1B:
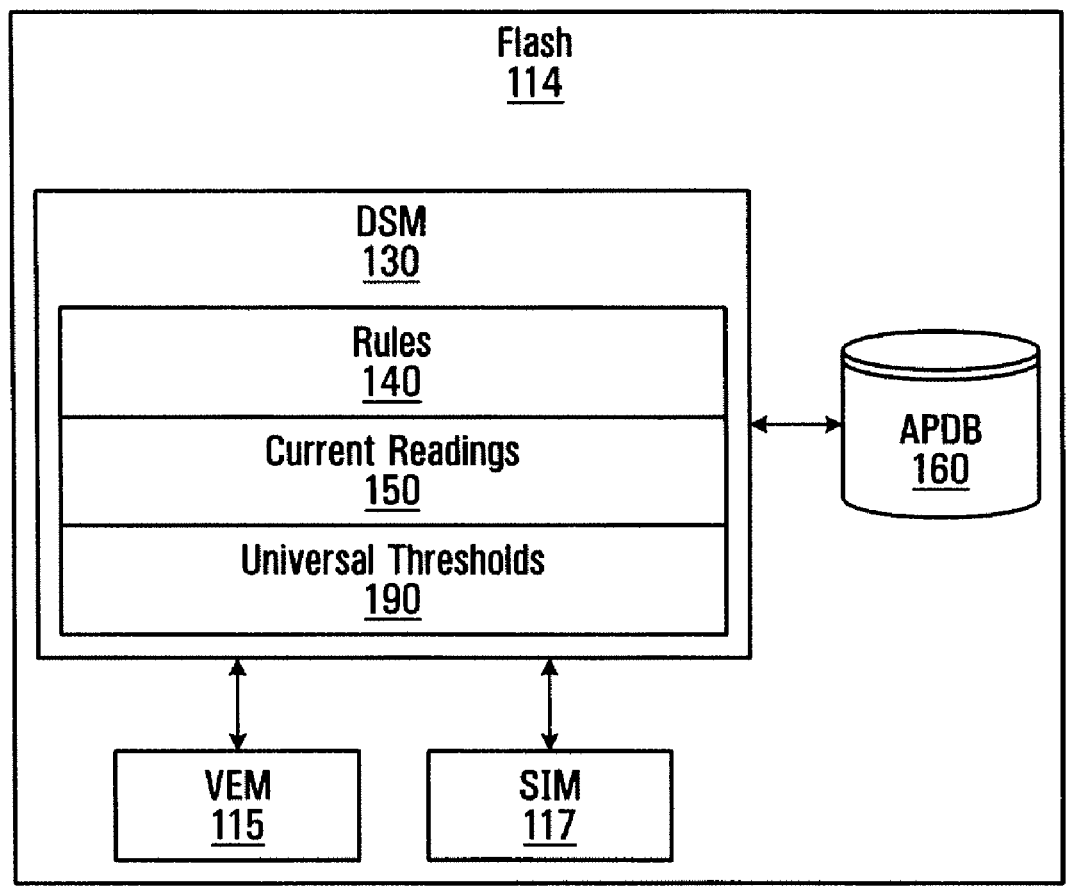
FIG. 1B is a schematic block diagram of software modules and data stored in the flash memory of the dual-mode mobile device of FIG. 1A.

FIG. 1B is a block diagram of a decisioning software module (DSM) 130 for making network selection decisions on mobile device 10. As described below, DSM 130 is configured to use both current and historical information to decide when to trigger a VHO for an ongoing communication session. Similarly, DSM 130 is configured to use both current and historical information to decide what network should be used when a new communication session is initiated. During operation, DSM 130 accesses and maintains a number of parameters and data values, including current readings 150, universal thresholds 190, and data stored in an access point database (APDB) 160. Network selection decisions made by DSM 130 are governed by a set of rules 140.

A VHO execution module (VEM) 115 is configured to carry out VHOs in response to commands received from DSM 130. VEM 115 may carry out VHOs in any conventional manner known to persons skilled in the art. Similarly, a session initiation module (SIM) 117 is configured to initiate communication sessions either via CMS 104 or via WCS 106 according to commands received from DSM 130. SIM 117 may initiate communication sessions in any conventional manner known to persons skilled in the art. DSM 130, VEM 115, SIM 117 and CDB 160 may all be stored in flash memory 114 of mobile device 10 (FIG. 1A), as shown.

Figure 1C:
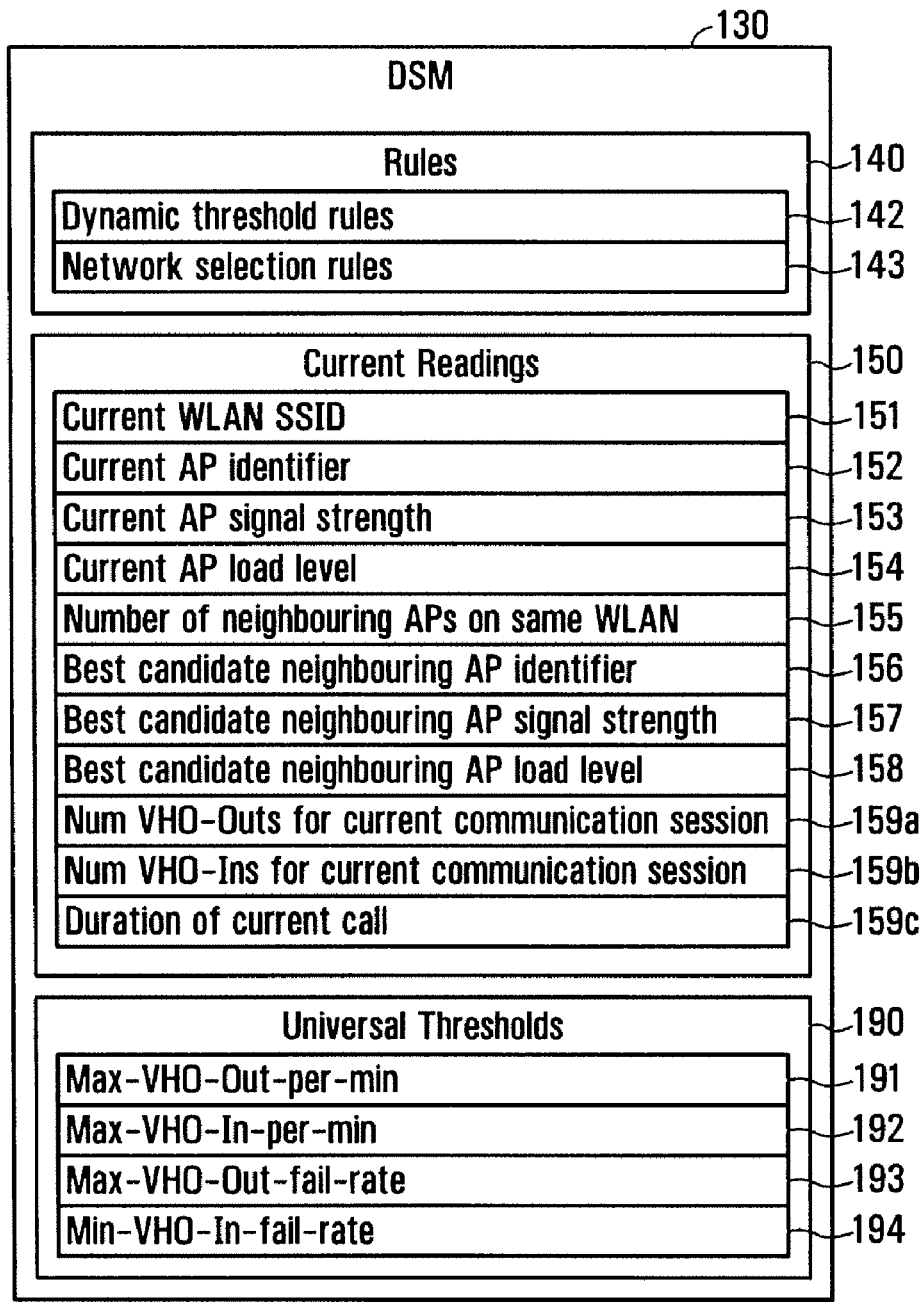
FIG. 1C is a schematic block diagram showing data stored in the flash memory.

As shown in FIG. 1C, current readings 150 include the following readings:

TABLE 1

Current readings 150 current WLAN SSID 151
current AP identifier 152, e.g. MAC address
current AP signal strength 153
current AP load level 154
number of neighbouring APs on same WLAN 155 (i.e. number of APs having the same SSID detected by mobile device 10 other than the serving AP)
best candidate neighbouring AP identifier 156, e.g. MAC address
best candidate neighbouring AP signal strength 157
best candidate neighbouring AP load level 158
number of VHO-Outs for the current communication session 159a
number of VHO-Ins for the current communication session 159b
duration of current call 159c Current readings 150 are periodically updated by DSM 130 with values received or measured by mobile device 10. The best candidate neighbouring AP may be, for example, the neighbouring AP having the highest signal strength.

As also shown in FIG. 1C, universal thresholds 190 include the following thresholds:

TABLE 2

Universal thresholds 190 maximum avg number of VHO-Outs per minute per communication session over at least a minimum number (X) of communication sessions within a preceding time window (Y) (Max-VHO-Out-per-min) 191
maximum avg number of VHO-Ins per minute per communication session over at least a minimum number (X) of communication sessions within a preceding time window (Y) (Max-VHO-In-per-min) 192
maximum avg VHO-Out fail rate over at least a minimum number (X) of VHO-Outs within a preceding time window Y (Max-VHO-Out-fail-rate) 193
minimum avg VHO-In fail rate over at least a minimum number (X) of VHO-Ins within a preceding time window (Y) (Min-VHO-In-fail-rate) 194

Universal thresholds 190 are set to default values, which may for example be predefined by the device manufacturer, when DSM 130 is first initialized. The various values X and Y in Table 2 may also be predefined by the device manufacturer.

For example, in one embodiment, with respect to thresholds 191 and 192, minimum number (X) of communication sessions may be set to five communication sessions, preceding time window (Y) may be set to one week, and the default values for Max-VHO-Out-per-min 191 and Max-VHO-In-per-min 192 may be set to one VHO-Out and one VHO-In, respectively; and, with respect to thresholds 193 and 194, minimum number (X) of VHO-Outs may be set to five VHO-Outs, preceding time window (Y) may be set to one week, and the default values for Max-VHO-Out-fail-rate 193 and Min-VHO-In-fail-rate 194 may be set to 30% and 2%, respectively. In one embodiment, universal thresholds 190 and the various values X and Y may be adjusted manually, for example, by the user through a conventional advanced settings user screen.

Figure 1D:
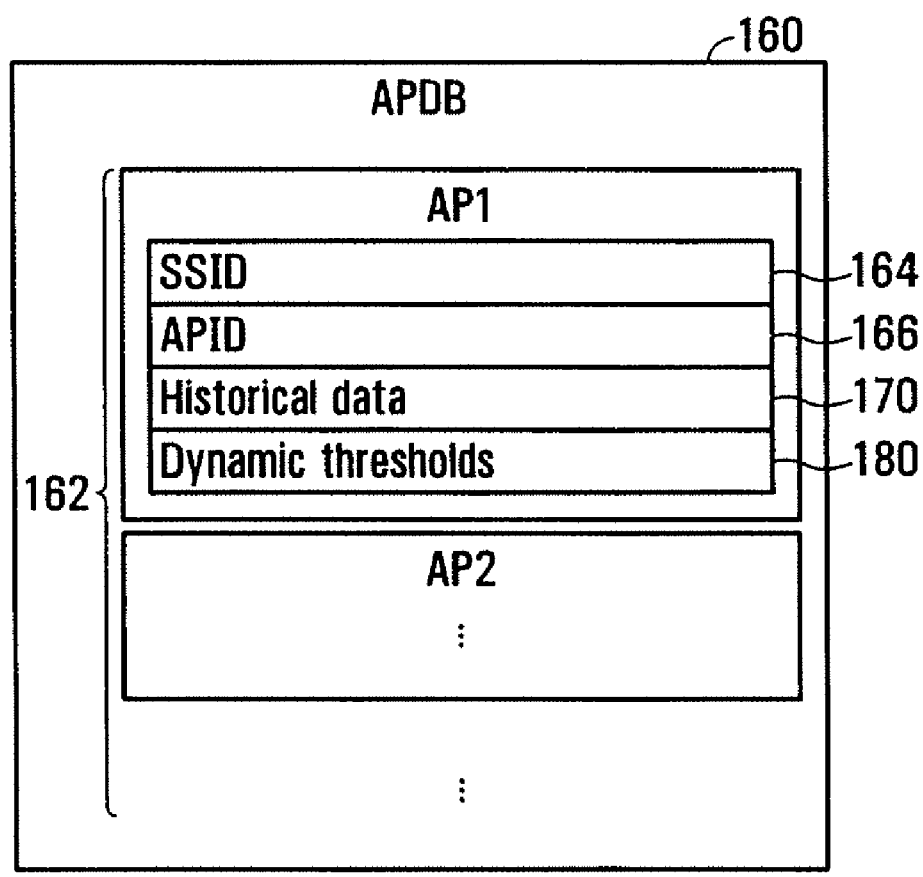
FIG. 1D is a schematic block diagram showing data stored in the flash memory.

APDB 160 is more specifically illustrated in FIG. 1D. As shown, APDB 160 may include a number of AP data entries 162, each corresponding to an AP encountered by mobile device 10. Each AP entry 162 includes an SSID 164 identifying the WLAN to which the AP belongs; an AP identifier 166, which may be for example the AP's Media Access Control (MAC) address; historical data 170; and dynamic thresholds 180. DSM 130 creates a new AP entry 162 in APDB 160 each time mobile device 10 associates itself with an AP for which an entry does not exist in APDB 160.

Figure 1E:
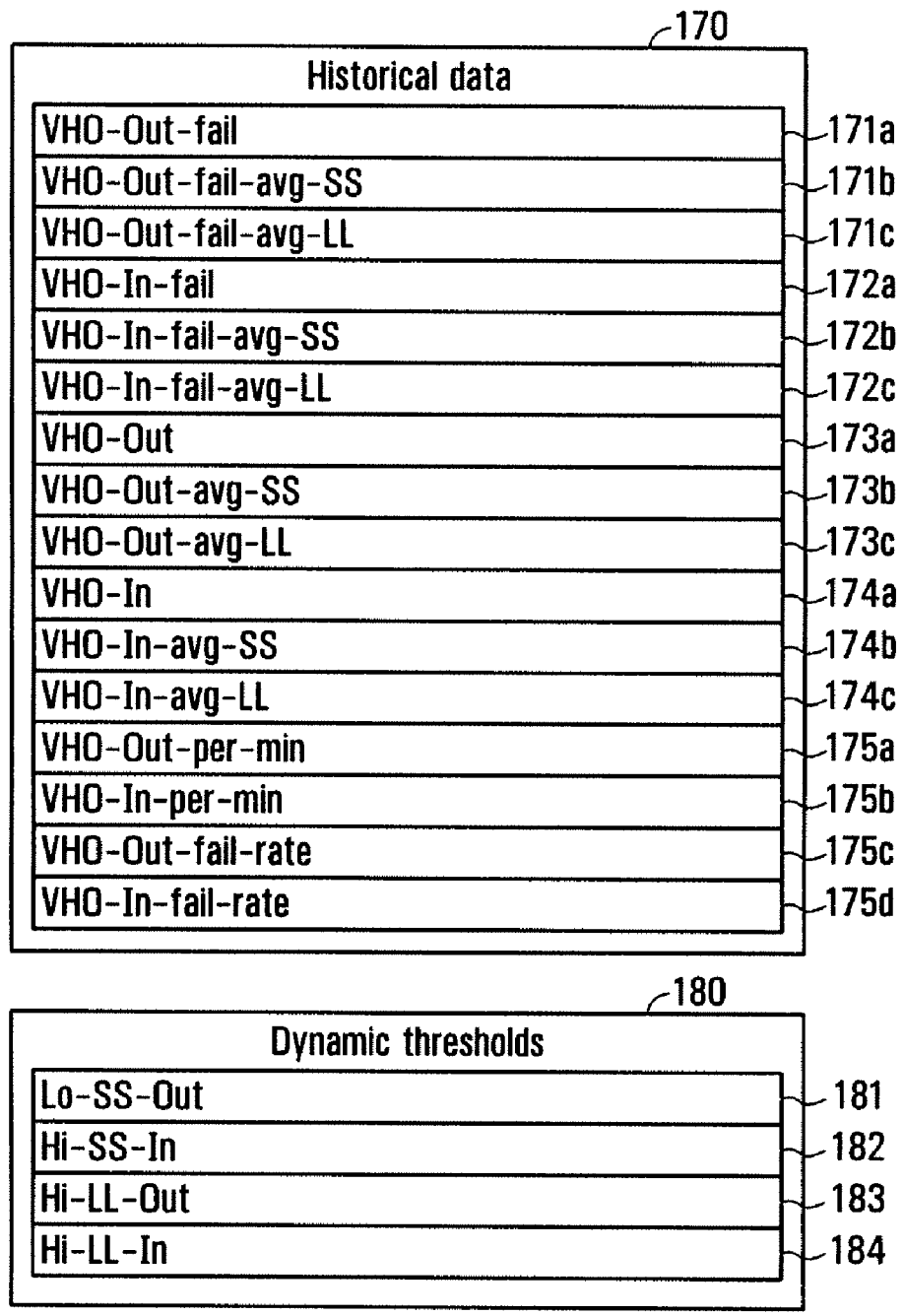
FIG. 1E is a schematic block diagram showing data stored in the flash memory.

As shown in FIG. 1E, historical data 170 for a given AP entry 162 includes the following data:

TABLE 3

Historical data 170 number of failed VHO-Outs within a preceding time window (Y) (VHO-Out-fail) 171a
average AP signal strength at VHO-Out failure (VHO-Out-fail-avg-SS) 171b
average AP load level at VHO-Out failure (VHO-Out-fail-avg-LL) 171c
number of failed VHO-Ins within a preceding time window (Y) (VHO-In-fail) 172a
average AP signal strength at VHO-In failure (VHO-In-fail-avg-SS) 172b
average AP load level at VHO-In failure (VHO-In-fail-avg-LL) 172c
number of successful VHO-Outs within a preceding time window (Y) (VHO-Out) 173a
average AP signal strength at VHO-Out (VHO-Out-avg-SS) 173b
average AP load level at VHO-Out (VHO-Out-avg-LL) 173c
number of successful VHO-Ins within a preceding time window (Y) (VHO-In) 174a
average AP signal strength at VHO-In (VHO-In-avg-SS) 174b
average AP load level at VHO-In (VHO-In-avg-LL) 174c
historic avg number of VHO-Outs per minute per communication session over at least a minimum number (X) of communication sessions within a preceding time window (Y) (VHO-Out-per-min) 175a
historic avg number of VHO-Ins per minute per communication session over at least a minimum number (X) of communication sessions within a preceding time window (Y) (VHO-In-per-min) 175b
historic avg VHO-Out fail rate over at least a minimum number (X) of VHO-Outs within a preceding time window Y (VHO-Out-fail-rate) 175c
historic avg VHO-In fail rate over at least a minimum number (X) of VHO-Ins within a preceding time window (Y) (VHO-In-fail-rate) 175d When DSM 130 creates a new AP entry 162 in APDB 160, all historical data 170 for the new AP entry 162 are initialized to zero. Thereafter, historical data 170 are updated by DSM 130 during operation of mobile device 10 in response to events relating to the AP represented by the AP entry 162. As will be appreciated, the various values X and Y in Table 3 correlate with the various values X and Y in Table 2. As described above with reference to universal thresholds 190, the various values X and Y may be predefined by the device manufacturer.

As also shown in FIG. 1E, dynamic thresholds 180 include the following thresholds:

TABLE 4

Dynamic thresholds 180 signal strength threshold for VHO-Out trigger (Lo-SS-Out) 181;
signal strength threshold for VHO-In trigger (Hi-SS-In) 182;
load level threshold for VHO-Out trigger (Hi-LL-Out) 183; and
load level threshold for VHO-In suppression (Hi-LL-In) 184.

When DSM 130 first creates a new AP entry 162 in APDB 160, the dynamic thresholds 180 for the new AP entry 162 are set to default values which may for example be predefined by the device manufacturer. As will be appreciated by those skilled in the pertinent arts, in order to avoid the potential of a ping-pong effect, the default value for Lo-SS-Out 181 is preferably lower than the default value for Hi-SS-In 182, and the default value for Hi-LL-In 184 is preferably lower than the default value for Hi-LL-Out 184. By way of example, dynamic thresholds 180 may be configured with the following default values: −78 dBm for Lo-SS-Out 181; −70 dBm for Hi-SS-In 182; 50% for Hi-LL-Out 183; and 20% for Hi-LL-In 184.

Thereafter, and as described in more detail below, the dynamic thresholds 180 are adjusted by DSM 130 during operation of mobile device 10 in response to changes in the historical data 170, in accordance with rules 140.

As shown in FIG. 1C, rules 140 include dynamic threshold rules 142 and network selection rules 143.

Dynamic threshold rules 142 define conditions for adjusting dynamic thresholds 180. The conditions defined by dynamic threshold rules 142 are based on historical data 170 and universal thresholds 190. Exemplary dynamic threshold rules 142 are shown in the following table:

TABLE 5

Dynamic threshold rules 142

RULE 1:
IF (VHO-Out-fail-rate > Max-VHO-Out-fail-rate) AND
    (VHO-Out-fail-avg-SS >= Lo-SS-Out) AND
    ((VHO-Out-fail-avg-SS + X1) < Hi-SS-In)
    Lo-SS-Out = VHO-Out-fail-avg-SS + X1
RULE 2:
IF (VHO-Out-fail-rate > Max-VHO-Out-fail-rate) AND
    (VHO-Out-fail-avg-LL <= Hi-LL-Out) AND
    ((VHO-Out-fail-avg-LL − Y1) > Hi-LL-In)
    Hi-LL-Out = VHO-Out-fail-avg-LL − Y1
RULE 3:
IF (VHO-In-fail-rate < Min-VHO-In-fail-rate) AND
    (Hi-SS-In − X2 > Lo-SS-Out)
    Hi-SS-In = Hi-SS-In − X2
RULE 4:
IF (VHO-In-fail-rate < Min-VHO-In-fail-rate) AND
    (Hi-LL-In + Y2 < Hi-LL-Out)
    Hi-LL-In = Hi-LL-In + Y2

TABLE 5-continued

Dynamic threshold rules 142

RULE 5:
IF (VHO-Out-per-min > Max-VHO-Out-per-min)
    Lo-SS-Out = Lo-SS-Out − X3
RULE 6:
IF (VHO-Out-per-min > Max-VHO-Out-per-min)
    Hi-LL-Out = Hi-LL-Out + Y3;
RULE 7:
IF (VHO-In-per-min > Max-VHO-In-per-min)
    Hi-SS-In = Hi-SS-In + X4;
RULE 8:
IF (VHO-In-per-min > Max-VHO-In-per-min)
    Hi-LL-In = Hi-LL-In − Y4;

Network selection rules 143 define conditions for triggering VHOs. The conditions defined by network selection rules 143 are based on current readings 150 and dynamic thresholds 180. Exemplary network selection rules 143 are shown in the following table:

TABLE 6

Network selection rules 143

RULE 1 (VHO-Out):
IF ((current AP SS <= Lo-SS-Out) OR (current AP LL >= Hi-LL-Out))
    IF ((number of neighbouring APs = 0)
        trigger VHO-Out;
    ELSE IF ((best neighbour SS < (neighbour)Lo-SS-Out) OR
        (best neighbour LL > (neighbour)Hi-LL-Out))
        trigger VHO-Out;
RULE 2 (VHO-In):
IF ((current AP SS >= Hi-SS-In) AND (current AP LL <= Hi-LL-In))
    trigger VHO-In;
RULE 3 (new communication session initiated):
IF (current WLAN SSID = NULL) // i.e. no APs in range
    initiate call on cellular;
ELSE IF ((current AP SS < Lo-SS-Out) OR (current AP LL > Hi-LL-Out))
    IF ((number of neighbouring APs = 0)
        initiate call on cellular;
    ELSE IF ((best neighbour SS < (neighbour)Lo-SS-Out) OR
        (best neighbour LL > (neighbour)Hi-LL-Out))
        initiate call on cellular;
    ELSE
        initiate call on WLAN;
ELSE
    initiate call on WLAN;

Methods of handling voice calls in accordance with an embodiment will now be described with reference to FIGS. 3, 4 and 5.

Figure 3:
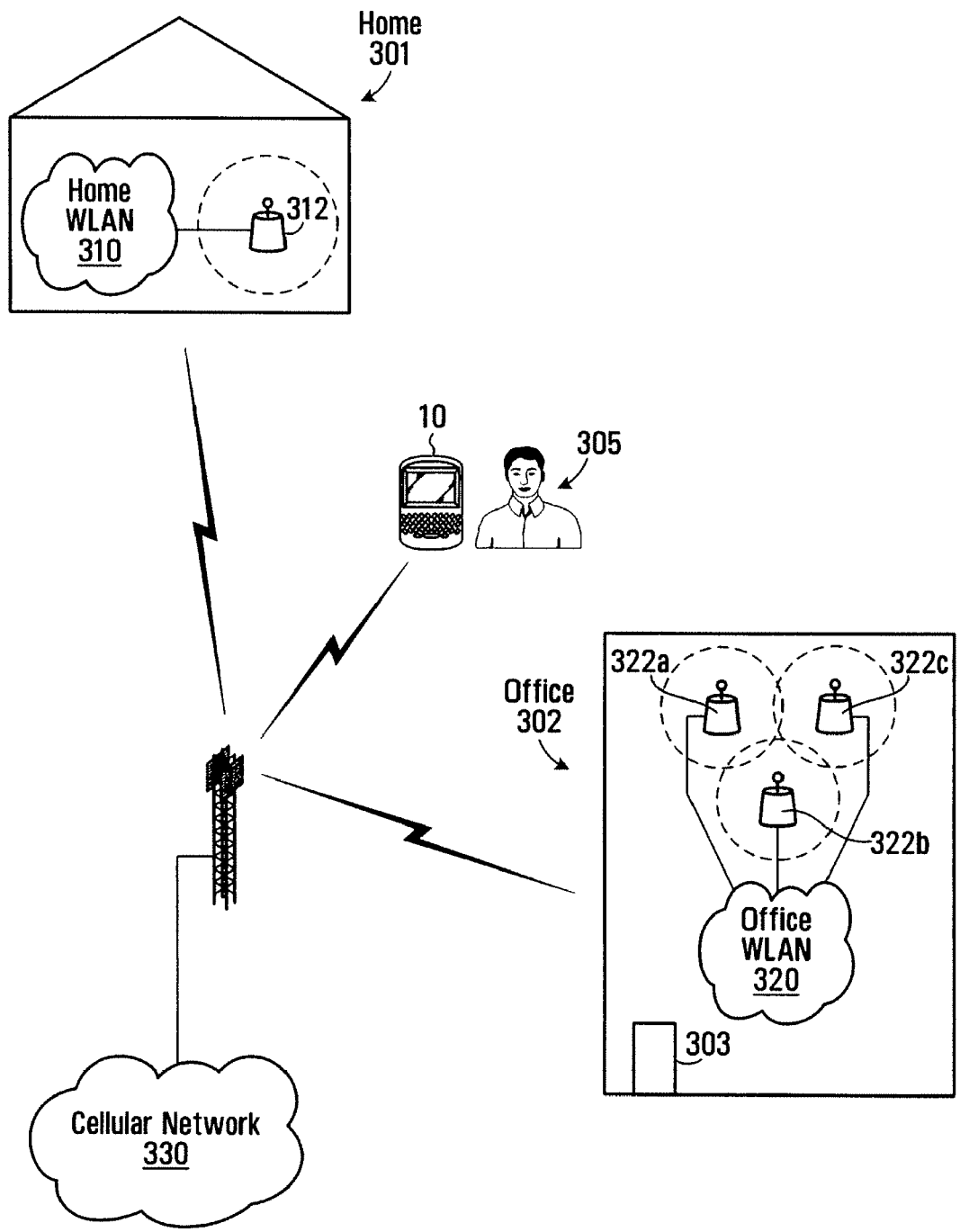
FIG. 3 is a schematic diagram of a wireless access system including the dual-mode mobile device of FIG. 1.

FIG. 3 illustrates a typical use case scenario. As shown, a user 305 of mobile device 10 uses mobile device 10 either at a home location 301, at an office location 302, or at a location outside of those two locations. A home WLAN 310 with one AP 312 is configured to provide network access in the home 301; an office WLAN 320 with three APs 322 is configured to provide network access in the office 302; and a cellular network 330 provides ubiquitous cellular access. For the purpose of the following discussion, mobile device 10 is assumed to have been set to WLAN priority mode (e.g. by default or manually by user 305). It is further assumed that an AP entry 162 for each of APs 312, 322*a*, 322*b*, 322*c* have already been created in APDB 160 of mobile device 10 due to previous associations between mobile device 10 and each of those APs.

Figure 4:
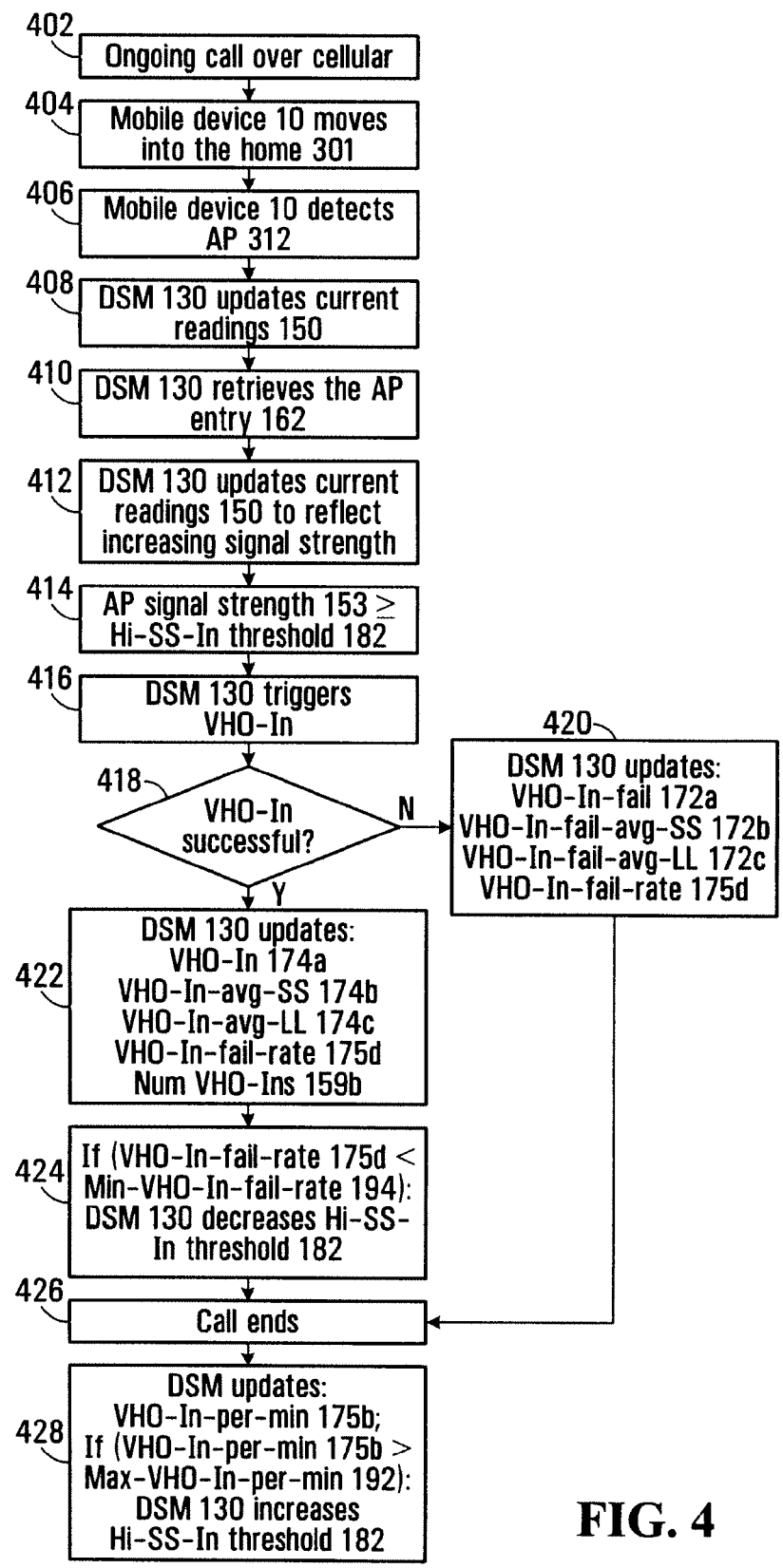
FIG. 4 illustrates steps of a method for handling a voice call exemplary of an embodiment.

FIG. 4 shows steps in a call scenario that are performed in accordance with an embodiment. At step 402, a voice call is in progress on mobile device 10 over the cellular network 330. Initially, mobile device 10 is located beyond the reach of either WLAN 310 or WLAN 320. At step 404, mobile device 10 is moved into the home 301 while still on the call. When mobile device 10 is moved within range of AP 312, mobile device 10 detects the beacon signal broadcast by AP 312 (step 406). DSM 130 updates the current readings 150 (step 408) and retrieves the AP entry 162 corresponding to AP 312 from APDB 160 using the SSID received in the beacon frame (step 410). As mobile device 10 is moved closer to AP 312, DSM 130 updates the value of current AP signal strength 153 to reflect the increasing signal strength received at mobile device 10 (step 412). When the value of current AP signal strength 153 reaches or exceeds the Hi-SS-In threshold 182 for the AP 312 (step 414), DSM 130 triggers a VHO-In procedure, in accordance with exemplary network selection Rule 2 (see Table 6, above) (step 416). If the VHO-In procedure fails (step 418), DSM 130 updates VHO-In-fail 172a, VHO-In-fail-avg-SS 172b, VHO-In-fail-avg-LL 172c, and VHO-In-fail-rate 175d of the AP entry 162 corresponding to AP 312 accordingly (step 420). If the VHO-In procedure succeeds (step 418), DSM 130 updates VHO-In 174a, VHO-In-avg-SS 174b, VHO-In-avg-LL 174c, and VHO-In-fail-rate 175d of the AP entry 162 corresponding to AP 312, as well as the number of VHO-Ins 159b for current communication session, accordingly (step 422). If VHO-In-fail-rate 175d is less than Min-VHO-In-fail-rate 194, DSM 130 may decrease the Hi-SS-In threshold 182 in accordance with exemplary dynamic threshold Rule 3 (see Table 5, above) (step 424). After the call ends (step 426), DSM 130 updates VHO-In-per-min 175b using the values for current readings 159b and 159c, and, if VHO-In-per-min 175b exceeds Max-VHO-In-per-min 192, DSM 130 may increase the Hi-SS-In threshold 182 in accordance with exemplary dynamic threshold Rule 7 (see Table 5, above) (step 428).

Figure 5:
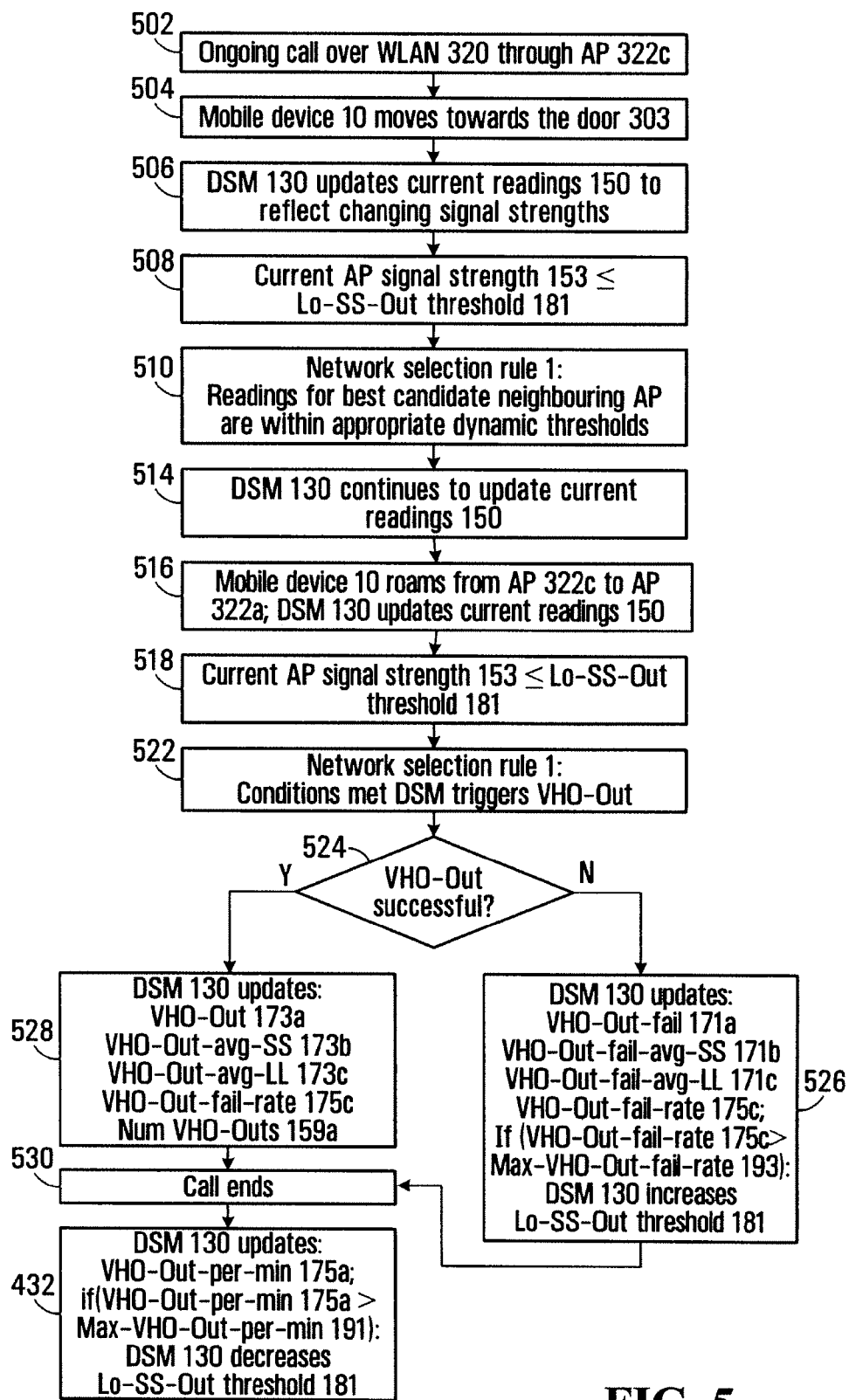
FIG. 5 illustrates steps of a method for handling a voice call exemplary of an embodiment.

FIG. 5 shows steps in a further call scenario that are performed in accordance with an embodiment. At step 502, a voice call is in progress on mobile device 10 over the WLAN 320 through AP 322c. Initially, mobile device 10 is located in the office 302. At step 504, mobile device 10 is moved towards the door 303 of the office 302 while still on the call. As mobile device 10 is moved away from AP 322c and towards AP 322a, DSM 130 updates the values of current readings 150 to reflect the changing signal strengths received at mobile device 10 (step 506). Eventually, the value of current AP signal strength 153 may reach or fall below the Lo-SS-Out threshold 181 in the AP entry 162 for AP 322c (step 508). In response, DSM 130 executes network selection Rule 1 (see Table 6, above) to determine whether to trigger a VHO-Out procedure (step 510). Since the number of neighbouring APs is not zero, DSM 130 checks whether the signal strength and load level readings for the best candidate neighbouring AP (in this example, AP 322a) are within appropriate dynamic thresholds 180. In this scenario, the readings are within appropriate levels, and therefore DSM 130 does not trigger a VHO-Out procedure, but simply continues to update the values of current readings 150 (step 514) until either the conditions for triggering a VHO-Out are met, or the WCS 106 causes mobile device 10 to roam from AP 322c to AP 322a. In this scenario, WCS 106 eventually causes mobile device 10 to roam from AP 322c to AP 322a, and DSM 130 updates current readings 150 appropriately (step 516). As the mobile device 10 continues towards the door 303 and out of the office 302, eventually the value of current AP signal strength 153 may reach or fall below the Lo-SS-Out threshold 181 in the AP entry 162 for AP 322a (step 518). In response, DSM 130 again executes network selection Rule 1 (see Table 6, above) and, as the conditions for a VHO-Out are met this time, DSM 130 triggers a VHO-Out procedure (step 522). If the VHO-Out procedure fails (step 524), DSM 130 updates VHO-Out-fail 171a, VHO-Out-fail-avg-SS 171b, VHO-Out-fail-avg-LL 171c, and VHO-Out-fail-rate 175c of the AP entry 162 corresponding to AP 322a accordingly and, if VHO-Out-fail-rate 175c exceeds Max-VHO-Out-fail-rate 193, DSM 130 may increase the Lo-SS-Out threshold 181 in accordance with exemplary dynamic threshold Rule 1 (see Table 5, above) (step 526). If the VHO-Out procedure succeeds (step 524), DSM 130 updates VHO-Out 173a, VHO-Out-avg-SS 173b, VHO-Out-avg-LL 173c, and VHO-Out-fail-rate 175c of the AP entry 162 corresponding to AP 322a, as well as the number of VHO-Outs 159a for current communication session, accordingly (step 528). After the call ends (step 530), DSM 130 updates VHO-Out-per-min 175a using the values for current readings 159a and 159c, and, if VHO-Out-per-min 175a exceeds Max-VHO-Out-per-min 191, DSM 130 may decrease the Lo-SS-Out threshold 181 in accordance with exemplary dynamic threshold Rule 5 (see Table 5, above) (step 532).

As will be appreciated by those skilled in the pertinent arts, different parameter sets for current readings 150, historical data 170, universal thresholds 190, dynamic thresholds 180, and rules 140 may be used in order to achieve different optimization strategies and objectives. For example, a further embodiment may utilize the following parameter sets:

TABLE 7

Current readings 150 current AP signal level;
current AP identifier;
best candidate neighbouring AP signal level;
current RTCP statistics; (As is known, RTCP, which stands for Real Time Protocol - Control Protocol, provides out-of-band statistics and control information for an RTP flow.)
network load;
number of VHO-Outs for the current call;
duration of current call;

TABLE 8

Universal thresholds 190

VHO-Out thresholds:

A1. target RTCP statistics;
A2. avg call drop rate over at least X calls within Y weeks
A3. avg # of VHO-Out per minute per call over at least X calls within Y weeks for signal increase adjustment
A4. avg VHO-Out failure rate (%) over at least X VHO-Outs within Y weeks for signal increase adjustment
A5. avg # of VHO-Out per minute per call over at least X calls within Y weeks for signal decrease adjustment
A6. avg VHO-Out failure rate (%) over at least X VHO-Outs within Y weeks for signal decrease adjustment TABLE 8-continued Universal thresholds 190

VHO-In thresholds:

B1. maximum network load;
B2. minimum time since last rove out
B3. avg # of VHO-Out per minute per call over at least X calls within Y weeks for VHO-In decision
B4. avg VHO-Out rate within Z minutes of VHO-In over at least X VHO-Ins within Y weeks for VHO-In decision
B5. avg VHO-Out rate within Z minutes of VHO-In over at least X VHO-Ins within Y weeks for signal increase adjustment
B6. avg VHO-Out rate within Z minutes of VHO-In over at least X VHO-Ins within Y weeks for signal decrease adjustment As noted above in relation to the first embodiment, universal thresholds 190 are set to default values, which may for example be predefined by the device manufacturer, when DSM 130 is first initialized. The various values X, Y and Z in Table 8 may also be predefined by the device manufacturer. For example, in one embodiment, with respect to thresholds A3 and A5, X may be set to five calls, Y may be set to one week, and the default values for A3 and A5 may be set to 1.0 and 0.2, respectively; with respect to thresholds A4 and A6, X may be set to five VHO-Outs, Y may be set to one week, and the default values for A4 and A6 may be set to 30% and 2%, respectively; and with respect to thresholds B5 and B6, Z may be set to one minute, X may be set to five VHO-Ins, Y may be set to one week, and the default values for B5 and B6 may be set to 30% and 2%, respectively. As noted above, universal thresholds 190 and the various values X, Y and Z may be adjusted manually, for example, by the user through a conventional advanced settings user screen.

TABLE 9

Historical data 170

H1. cumulative # of call drops within past Y weeks
H2. total number of calls within past Y weeks
H3. historic avg call drop rate over at least X calls within Y weeks
H4. historic avg # of VHO-Out per minute per call over at least X calls within Y weeks
H5. cumulative # VHO-Out failure within past Y weeks
H6. total number of VHO-Out attempt within past Y weeks
H7. historic avg VHO-Out failure rate over at least X VHO-Outs within Y weeks
H8. cumulative # of VHO-Out within Z minutes of VHO-In within past Y weeks
H9. total number VHO-In attempt within past Y weeks
H10. historic avg VHO-Out rate within Z minutes of VHO-In over at least X VHO-Ins within Y weeks As will be appreciated, the various values X, Y and Z in Table 9 correlate with the various values X, Y and Z in Table 8.

TABLE 10

Dynamic thresholds 180

D1. signal strength threshold for VHO-Out trigger; and

D2. signal strength threshold for VHO-In trigger.

TABLE 11

Dynamic threshold rules 142

RULE 1:
if ( H7 > A4 || H4 > A3 )
    increase D1 by K amount
    reinitialized all statistics
else if ( H7 < A6 || H4 < A5 )
    decrease D1 by K amount
    reinitialized all statistics
RULE 2:
if( H10 > B5 )
    increase D2 by K amount
    reinitialized all statistics
else if( H10 < B6 )
    decrease D2 by K amount
    reinitialized all statistics

TABLE 12

Network selection rules 143

RULE 1 (VHO-Out):
if( current AP signal level < D1 )
    and ( neighbouring AP signal level < (neighbour)D1 )
    trigger VHO-Out
else if( current RTCP stats > A1 )
    trigger VHO-Out
else if ( H3 > A2 )
    trigger VHO-Out
RULE 2 (VHO-In):
if( current AP signal level > D2 )
    and ( time since last rove out > B2 )
    and ( network load available && (current network load < B1) )
    and ( H10 < B4 )
    and ( H4 < B3 )
    trigger VHO-In Other modifications will be apparent to those skilled in the art.

What is claimed is:

1. A method of handling a communication session, comprising:

at a wireless mobile communications device:

receiving an indication of current signal strength of an access point for a wireless local area network ("WLAN");

retrieving a signal strength threshold associated with said access point;

if said communication session is currently carried by a cellular network and said current signal strength exceeds said signal strength threshold, switching said communication session from said cellular network to said WLAN;

adjusting a metric based on timing of said switching relative to any switch of said communication session from said WLAN to said cellular network over a preceding time window associated with said access point; and based on said metric, selectively adjusting said signal strength threshold associated with said access point;

wherein said metric is based on an average switch rate, at said wireless mobile communications device, from said access point of said WLAN to said cellular network within a predefined number of minutes of a switch from said cellular network to said WLAN, within said preceding time window.

2. The method of claim 1, wherein said selectively adjusting said signal strength threshold associated with said access point comprises increasing said signal strength threshold if said metric exceeds a maximum threshold for said metric.

3. The method of claim 2, wherein said selectively adjusting said signal strength threshold associated with said access point further comprises decreasing said signal strength threshold if said metric is below a minimum threshold for said metric.

4. The method of claim 3, wherein said preceding time window is one week; said predefined number of minutes is one minute; said maximum threshold for said metric is a thirty percent switch rate on average from said access point of said WLAN to said cellular network within said predefined number of minutes of a switch from said cellular network to said WLAN, within said preceding time window; and said minimum threshold for said metric is a two percent switch rate on average from said access point of said WLAN to said cellular network within said predefined number of minutes of a switch from said cellular network to said WLAN, within said preceding time window.

5. The method of claim 1, wherein said communication session is a voice call.

6. A method of handling a communication session, comprising:

at a wireless mobile communications device:

receiving an indication of current signal strength of an access point for a wireless local area network ("WLAN");

retrieving a signal strength threshold associated with said access point;

if said communication session is currently carried by said WLAN and said current signal strength is below said signal strength threshold, attempting to switch said communication session from said WLAN to a cellular network;

adjusting a failure rate associated with said access point based on whether said attempting to switch said communication session from said WLAN to said cellular network failed;

where said attempting to switch results in a switch, adjusting a switch rate associated with said access point so that said switch rate reflects the number of switches per minute of said communication session from said WLAN to said cellular network and the number of such switches per minute of previous communication sessions over a preceding time window; and based on said failure rate and said switch rate, selectively adjusting said signal strength threshold associated with said access point.

7. The method of claim 6, wherein said selectively adjusting said signal strength threshold associated with said access point comprises increasing said signal strength threshold if said metric exceeds a maximum threshold for said metric.

8. The method of claim 7, wherein said selectively adjusting said signal strength threshold associated with said access point further comprises decreasing said signal strength threshold if said metric is below a minimum threshold for said metric.

9. The method of claim 8, wherein said metric is based on an average rate of failed switches, at said wireless mobile communications device, from said access point of said WLAN to said cellular network, within a preceding time window.

10. The method of claim 6, wherein said selectively adjusting said signal strength threshold associated with said access point comprises increasing said signal strength threshold if said failure rate exceeds a first maximum threshold for said failure rate or if said switch rate exceeds a second maximum threshold for said further metric, and decreasing said signal strength threshold if said failure rate is below a first minimum threshold for said failure rate or if said switch rate is below a second minimum threshold for said switch rate.

11. The method of claim 10, wherein said preceding time window is a first preceding time window and said failure rate is based on an average rate of failed switches, at said wireless mobile communications device, from said access point of said WLAN to said cellular network, within a second preceding time window.

12. The method of claim 11, wherein said first preceding time window is one week; said second preceding time window is one week; said first maximum threshold for said failure rate is a thirty percent rate of failed switches from said access point of said WLAN to said cellular network within said first preceding time window; said second maximum threshold for said switch rate is one switch on average from said access point of said WLAN to said cellular network per minute per communication session within said second preceding time window; said first minimum threshold for said failure rate is a two percent rate of failed switches from said access point of said WLAN to said cellular network within said preceding time window; and said second minimum threshold for said switch rate is 0.2 switches on average from said access point of said WLAN to said cellular network per minute per communication session within said second preceding time window.

13. The method of claim 6, wherein said communication session is a voice call.

14. A method of handling a communication session, comprising:

at a wireless mobile communications device:

receiving an indication of current signal strength of an access point for a wireless local area network ("WLAN");

retrieving a signal strength threshold associated with said access point;

if said communication session is currently carried by said WLAN and said current signal strength is below said signal strength threshold, attempting to switch said communication session from said WLAN to a cellular network;

adjusting a metric associated with said access point based on whether said attempting to switch said communication session from said WLAN to said cellular network failed;

based on said metric, selectively adjusting said signal strength threshold associated with said access point;

wherein said selectively adjusting said signal strength threshold associated with said access point comprises increasing said signal strength threshold if said metric exceeds a maximum threshold for said metric;

wherein said selectively adjusting said signal strength threshold associated with said access point further comprises decreasing said signal strength threshold if said metric is below a minimum threshold for said metric;

wherein said metric is based on an average rate of failed switches, at said wireless mobile communications device, from said access point of said WLAN to said cellular network, within a preceding time window; and wherein said preceding time window is one week; said maximum threshold for said metric is a thirty percent rate of failed switches from said access point of said WLAN to said cellular network within said preceding time window; and said minimum threshold for said metric is a two percent rate of failed switches from said access point of said WLAN to said cellular network within said preceding time window.

15. A dual mode mobile communication device comprising a memory, a speaker, a microphone, and a processor, said processor configured to:

during a communication session:

receive an indication of current signal strength of an access point for a wireless local area network ("WLAN");

retrieve a signal strength threshold associated with said access point;

if said communication session is currently carried by a cellular network and said current signal strength exceeds said signal strength threshold, attempt to switch said communication session from said cellular network to said WLAN;

adjust a failure rate based on timing of said switching relative to any switch of said communication session from said WLAN to said cellular network over a preceding time window associated with said access point;

where said attempt to switch results in a switch, adjust a switch rate associated with said access point so that said switch rate reflects the number of switches per minute of said communication session from said WLAN to said cellular network and the number of such switches per minute of previous communication sessions over a preceding time window; and based on said failure rate and said switch rate, selectively adjust said signal strength threshold associated with said access point.

16. A non-transitory computer readable medium containing computer readable instructions which when executed by a processor of a dual mode mobile communication device, cause said processor to:

during a communication session:

receive an indication of current signal strength of an access point for a wireless local area network ("WLAN");

retrieve a signal strength threshold associated with said access point;

if said communication session is currently carried by a cellular network and said current signal strength exceeds said signal strength threshold, attempt to switch said communication session from said cellular network to said WLAN;

adjust a failure rate based on timing of said switching relative to any switch of said communication session from said WLAN to said cellular network over a preceding time window associated with said access point;

where said attempt to switch results in a switch, adjust a switch rate associated with said access point so that said switch rate reflects the number of switches per minute of said communication session from said WLAN to said cellular network and the number of such switches per minute of previous communication sessions over a preceding time window; and based on said failure rate and said switch rate, selectively adjust said signal strength threshold associated with said access point.

* * * * *